United States Patent [19]

Takenaka

[11] 4,085,981

[45] Apr. 25, 1978

[54] TRACK ROLLER DEVICE

[76] Inventor: Hideo Takenaka, 16-10, Kugahara 6-chome Ohta-ku, Tokyo, Japan

[21] Appl. No.: 710,404

[22] Filed: Aug. 2, 1976

[30] Foreign Application Priority Data

Aug. 15, 1975 Japan .............................. 50-112048[U]

[51] Int. Cl.² ........................ F16C 13/00; F16C 33/74; F16C 35/02
[52] U.S. Cl. ..................................... 308/20; 308/103; 308/109
[58] Field of Search ................... 308/18, 20, 103, 109; 184/6.26, 105 R

[56] References Cited

U.S. PATENT DOCUMENTS

| 3,866,985 | 2/1975 | Whitehurst | 308/20 |
|---|---|---|---|
| 3,869,179 | 3/1975 | Ricca et al. | 308/20 |
| 3,917,362 | 11/1975 | Stejman | 308/20 |

Primary Examiner—Richard A. Bertsch

Attorney, Agent, or Firm—Blanchard, Flynn, Thiel, Boutell & Tanis

[57] ABSTRACT

A track roller device comprising a shaft having a pair of axially spaced inside cylinders rotatably supported thereon, which cylinders have radially projecting annular flanges at the axially outer ends thereof. An intermediate cylinder is mounted on and surrounds the inside cylinders and is fixedly connected thereto. The intermediate cylinder has a radially outwardly projecting annular boss disposed substantially midway between the axial ends thereof. Separate rollers are removably mounted on the right and left ends of the intermediate cylinder and abut the opposite sides of the boss. The radial flanges of the inside cylinders are accommodated within cylindrical recesses formed in the radially outer ends of the rollers, and these flanges abut end walls formed on the rollers, whereby the rollers are thus axially confined between the flanges and the annular boss. A lubricant supply inlet extends radially through the boss for permitting lubricant to be supplied to suitable passages formed between the intermediate cylinder and the inside cylinders.

5 Claims, 5 Drawing Figures

TRACK ROLLER DEVICE

BACKGROUND OF THE INVENTION

1. Field of the Invention

This invention relates to an improved track roller device.

2. Description of the Prior Art

The oil supply system of a conventional track roller device will be hereinafter described with reference to FIG. 5, which is an elevational sectional view of a conventional track roller device with the upper half in section.

As shown in FIG. 5, a conventional track roller device is produced by molding a one-piece casting containing left and right rollers 120c and 130c, or by separately molding the left and right rollers 120c and 130c and then fixing them together, such as by welding. Therefore, in the case of the conventional device, rollers such as single-flange rollers and double-flange rollers cannot be selected at will for assembly. When a part of the rollers 120c and 130c becomes worn, typical repair procedures include replacement of the entire roller device or padding of the worn parts with a hard alloy for reuse. The former procedure is very expensive and uneconomical and the latter procedure is time-consuming and requires discontinuing operation of the roller device for a long time. Since the rollers in the conventional device are integrally formed with each other, the oil supply system is very complicated and therefore the operational efficiency of the oiling procedure is extremely poor. A central passage 30c is provided in the shaft 40c and extends axially from one end thereof. Radial passages 33c and 34c are provided in the shaft and extend from the central passage 30c to the oil chambers 21c and 22c, respectively. Inside cylinders 50c and 60c are fitted between the outside surface of shaft 40c and the inside surfaces of the rollers 120c and 130c. Recesses 54c and 64c are provided on the outside surfaces of the inside cylinders 50c and 60c. At the bottoms of the recesses 54c and 64c, there are provided radial passages 55c and 65c leading to the outside surface of the shaft 40c and axial passages 56c and 66c leading to the oil chambers 21c and 22c. A plug 35c is screwed in the central passage 30c from one end thereof.

As a result, in the case of the conventional device, the provision of deep and long passages is very difficult and very expensive. In addition, oil must be supplied from above, with the shaft 40c kept vertical, and therefore the operating efficiency is poor and a desired amount of oil cannot be fully supplied to the portions that require lubrication.

SUMMARY OF THE INVENTION

It is an object of the present invention to provide a track roller device which is light in weight, which can be produced by machining with small-sized machine tools, and in which worn parts can be replaced in a short period of time thereby minimizing the time during which the device is out of service.

It is another object of the present invention to provide a track roller device in which efficient and uniform lubrication of the device can be performed without changing the position of the shaft.

It is still another object of the present invention to provide a track roller device in which the inside of the roller is water-tight and therefore is prevented from rusting, and in which no slippage occurs between the inside surface of the roller and the intermediate cylinder that supports the roller even when impact or rolling is applied thereto.

BRIEF DESCRIPTION OF THE DRAWINGS

The above and other objects, features and advantages of the present invention will be hereinafter described in conjunction with the accompanying drawings in which like reference characters designate corresponding parts throughout the views and in which.

DETAILED DESCRIPTION

Figure 1:
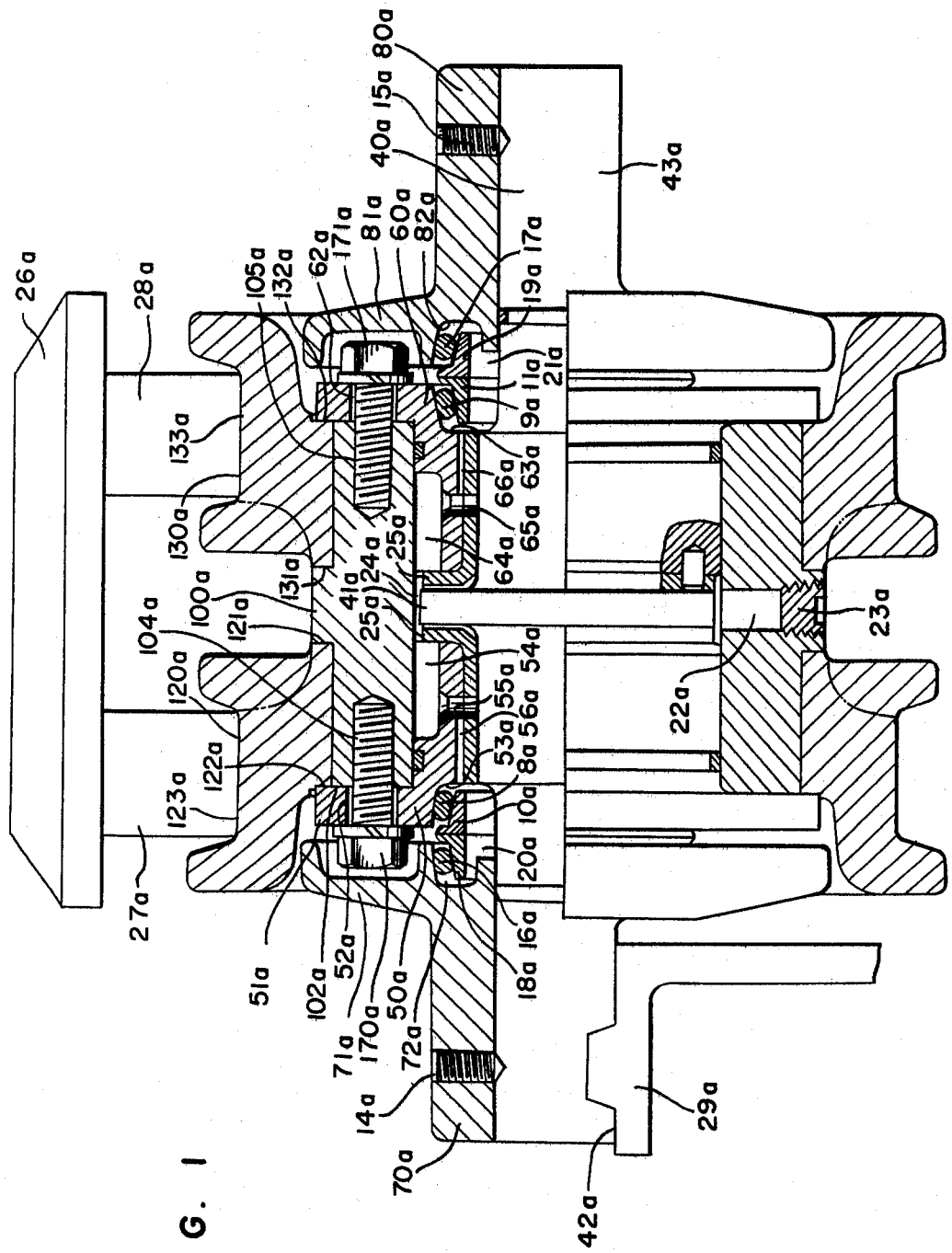
FIG. 1 is an elevational view, partly in section, of a track roller device according to a preferred embodiment of the present invention, with the upper half and essential parts thereof being shown in section.
Figure 2:
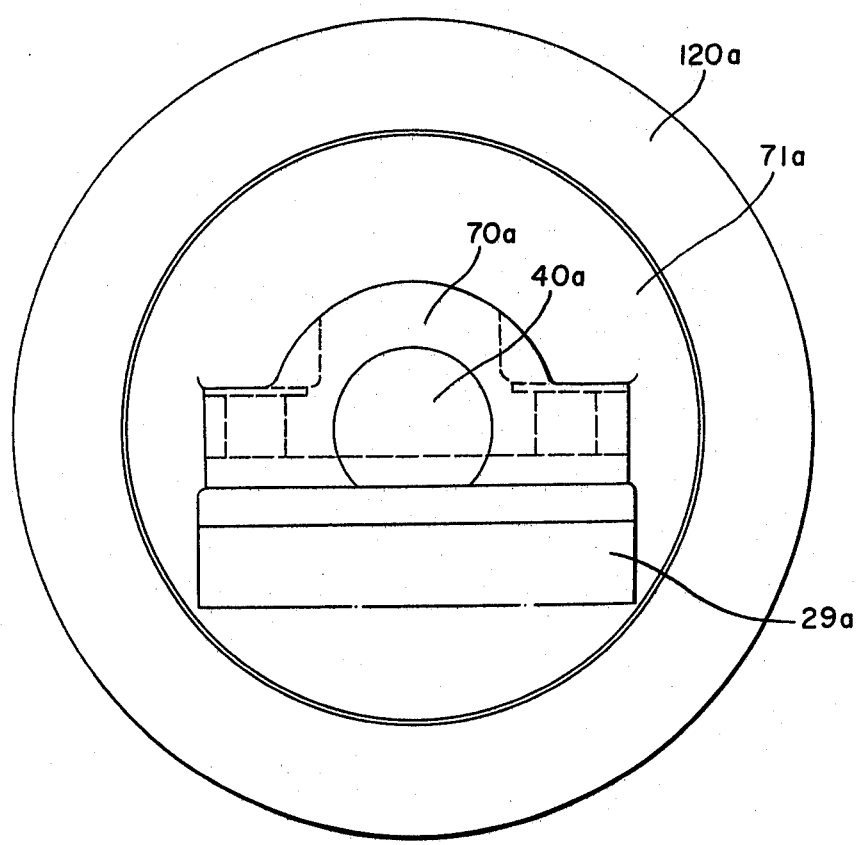
FIG. 2 is an end view of the device shown in FIG. 1.
Figure 3:
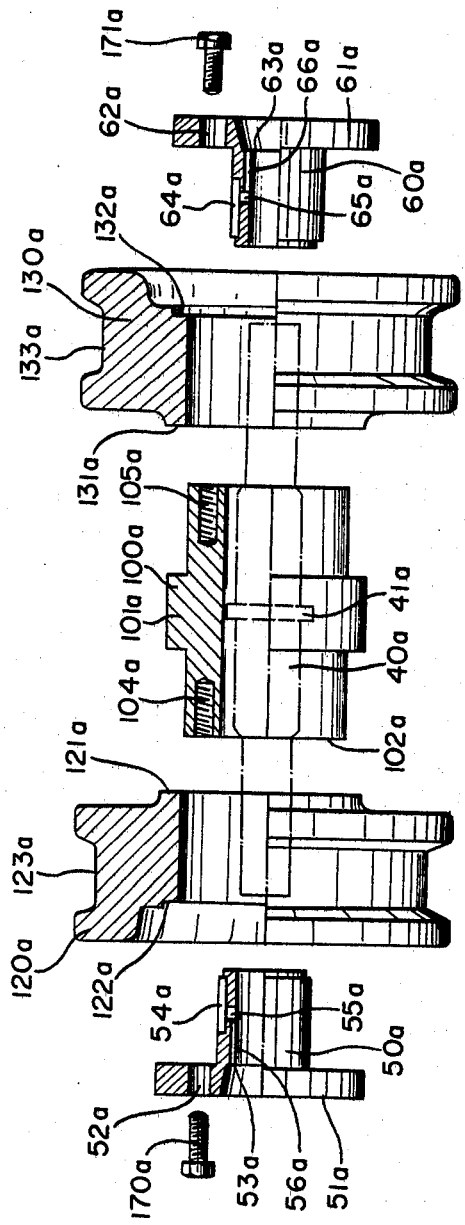
FIG. 3 is an exploded view of the device of FIG. 1 including two rollers, an intermediate cylinder and two inner cylinders, with the upper half being shown in section.

Reference is now made to FIGS. 1 and 3. Reference numeral 100a designates an intermediate cylinder having an annular boss 101a projecting radially from the outside surface thereof at the axial center of said cylinder. Reference numerals 120a and 130a designate a pair of rollers which are fitted onto the right and left sides of the intermediate cylinder 100a on opposite sides of the boss 101a. The inner ends 121a and 131a of the rollers abut against the sides of the annular boss 101a. Reference numeral 40a designates a shaft which extends through the intermediate cylinder 100a. The collar 41a of the shaft 40a is positioned at the center of the intermediate cylinder 100a. Inside cylinders 50a and 60a are inserted between the inside surface of the intermediate cylinder 100a and the outside surface of the shaft 40a on opposite axial sides of the shaft collar 41a, as shown. The inside cylinders 50a and 60a are rotatably supported on the shaft by bushings. The flange 51a of the inside cylinder 50a abuts against the axially outer end surface 122a of the roller 120a and also against the axially outer end surface 102a of the intermediate cylinder 100a. In like fashion, the flange 61a of the inside cylinder 60a abuts against the axially outer end surface 132a of the roller 130a and the axially outer end surface 103a of the intermediate cylinder 100a. Through-holes 52a and 62a are provided on the inside cylinder flanges 51a and 61a, respectively, and are aligned with axially extending tapped holes 104a and 105a that extend through the axially outer end surfaces of the intermediate cylinder 100a, respectively. Bolts 170a and 171a extend through the through-holes 52a, 62a, and are threaded into the tapped holes to fix the inside cylinders 50a and 60a to the intermediate cylinder 100a.

The flanges 51a and 61a have central circular openings 53a and 63a, respectively. Floating rings 10a and 11a are loosely inserted in the circular openings 53a and 63a, respectively, and they engage O-rings 8a and 9a to press said O-rings against the inside surfaces of the circular holes 53a and 63a, respectively. Reference numerals 70a and 80a designate covers fitted onto the left and right ends of the shaft 40a, respectively, and these covers are fixed to the shaft 40a by screws 14a and 15a, respectively. The covers 70a and 80a have collars 71a and 81a, respectively, whose inside surfaces are provided with annular grooves 72a and 82a, respectively. Floating rings 18a and 19a are inserted in the annular grooves 72a and 82a, respectively, so as to press O-rings 16a and 17a against the outer surfaces of the annular grooves 72a and 82a, respectively. The floating rings 10a and 18a are positioned with the axial ends thereof in close contact with each other to form a closed oil chamber 20a. In the same manner, the floating rings 11a and 19a form a closed oil chamber 21a.

Reference numeral 22a designates an oil inlet formed in the annular boss 101a of the intermediate cylinder 100a. The oil inlet 22a is closed by a tapered plug 23a.

A small annular gap 24a is formed between the inside surface of the intermediate cylinder 100a and the collar 41a of the shaft 40a. In addition, small gaps are formed between the inside surface of the intermediate cylinder 100a and the radially outer surfaces of the bushings of the inside cylinders 50a and 60a at the axially inner ends thereof.

Several axially extending recesses 54a are formed on the circumferential surface of the inside cylinder 50a. The recess 54a communicates with the gap 25a. At the radially inner side of the recess 54a, there is provided a radial hole 55a leading to the outside surface of the shaft 40a and an axial hole 56a leading to the circular opening 53a. In the same manner, several recesses 64a are formed on the circumferential surface of the inside cylinder 60a. The recess 64a communicates with the gap 25a. At the bottom of the recess 64a, there is provided a radial hole 65a leading to the outside surface of the shaft 40a and an axial hole 66a leading to the circular opening 63a.

Reference numeral 26a designates a shoe plate whose struts 27a and 28a are fitted to the circumferential recesses 123a and 133a of the rollers 120a and 130a, respectively. Both ends 42a and 43a of the shaft 40a are made flat, and are mounted on the frame 29a of a vehicle. The covers 70a and 80a are fixed on the frame 29a by bolts, respectively.

OPERATION

First the taper plug 23a is removed and lubricant such as oil is introduced in the device through the oil inlet 22a. Oil flows into recesses 54a and 64a through the gaps 24a and 25a. Then the oil arrives at the outside surface of the shaft 40a through the radial holes 55a and 65a, and flows into the oil chambers 20a and 21a through the axial holes 56a and 66a, respectively. When the shoe plate 26a is driven, the movement of the shoe plate 26a causes the rollers 120a and 130a to rotate about the shaft 40a.

According to the present invention, when either of the rollers has been partly worn, only the worn roller is required to be replaced. As a result, replacement can be made very easily and therefore the duration of suspension of operation of the device can be decreased. In addition, the above-mentioned partial replacement leads to saving of materials.

The roller is a ring-shaped body fitted to the intermediate cylinder and therefore is lighter in weight than a conventional roller, and therefore the cost of materials can be decreased. Furthermore, the rollers are separate, that is, a plurality of rollers are made. Accordingly, each roller can be made light in weight and small in size.

As a result, the roller can be machined by a small-sized machine tool, and thereby the machining cost as a whole can be remarkably decreased even though the number of surfaces to be machined may be somewhat increased. Consequently, the manufacturing cost of the device is very low.

Besides, according to the present invention, rollers suitably selected from among single-flange rollers and double-flange rollers can be assembled with the same intermediate cylinder. Accordingly, it is not necessarily required to have single-roller devices and double-roller devices in stock. In other words, a suitable stock of intermediate cylinder assemblies, single-flange rollers and double-flange rollers will be sufficient for meeting the demand of users. Therefore, the total stock of parts and the transportation expenses thereof can be greatly decreased.

Moreover, according to the present invention, oil can be easily supplied from above in an assembled state where the shaft is kept horizontal, and therefore it is not necessary to provide an elongated axial hole in the shaft, unlike the conventional device. This fact also facilitates production of the device. In addition, a sufficiently large oil inlet can be provided on the collar of the shaft and therefore air present in the oil passage, oil chamber, etc. can be easily removed therefrom. Consequently, oil can be rapidly supplied throughout the device. Unlike the case of the conventional device, the end surface of the shaft is flat and does not have a projecting plug thereon, and therefore it does not become contaminated with dirt and dust and it is easily cleaned.

In the above embodiment, the rollers are shown as being mounted on the intermediate cylinder 100a by the aid of the boss 101a provided on the cylinder. However, the boss 101a can be omitted. In other words, according to the present invention, the rollers can be press-fitted onto the both ends of the intermediate cylinder or can be in spline-mesh engagement therewith. Furthermore, the rollers can be fixed on the intermediate cylinder by fitting their bosses in the both ends of the central holes of the cylinder, respectively, or by directly fixing them on the cylinder by the aid of collars integrally provided thereon, or by removably press-fitting them onto the cylinder without using screws.

Figure 4:
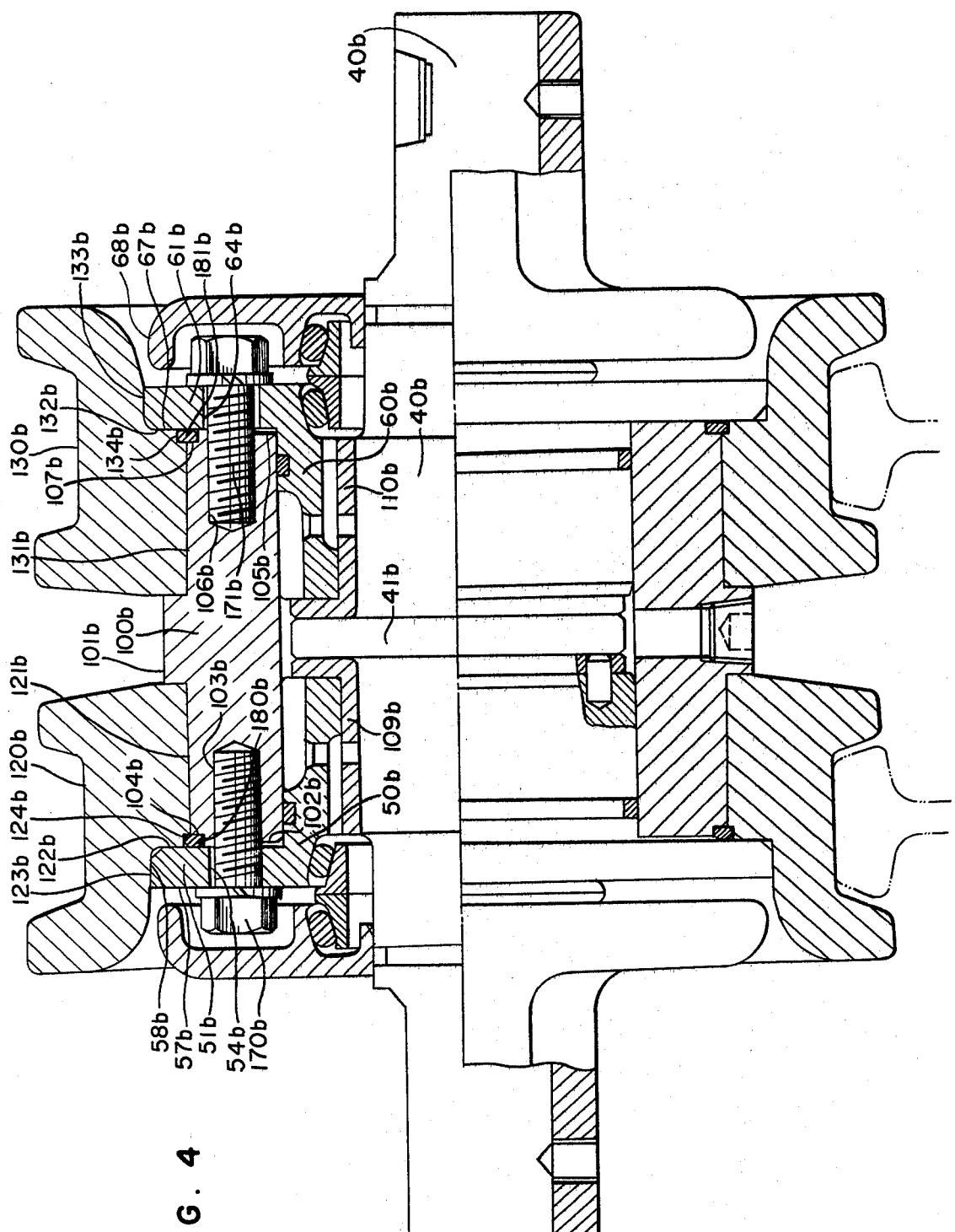
FIG. 4 is an elevational view, partly in section, of a track roller device according to another embodiment of the present invention, with the upper half and essential parts thereof being shown in section.
Figure 5:
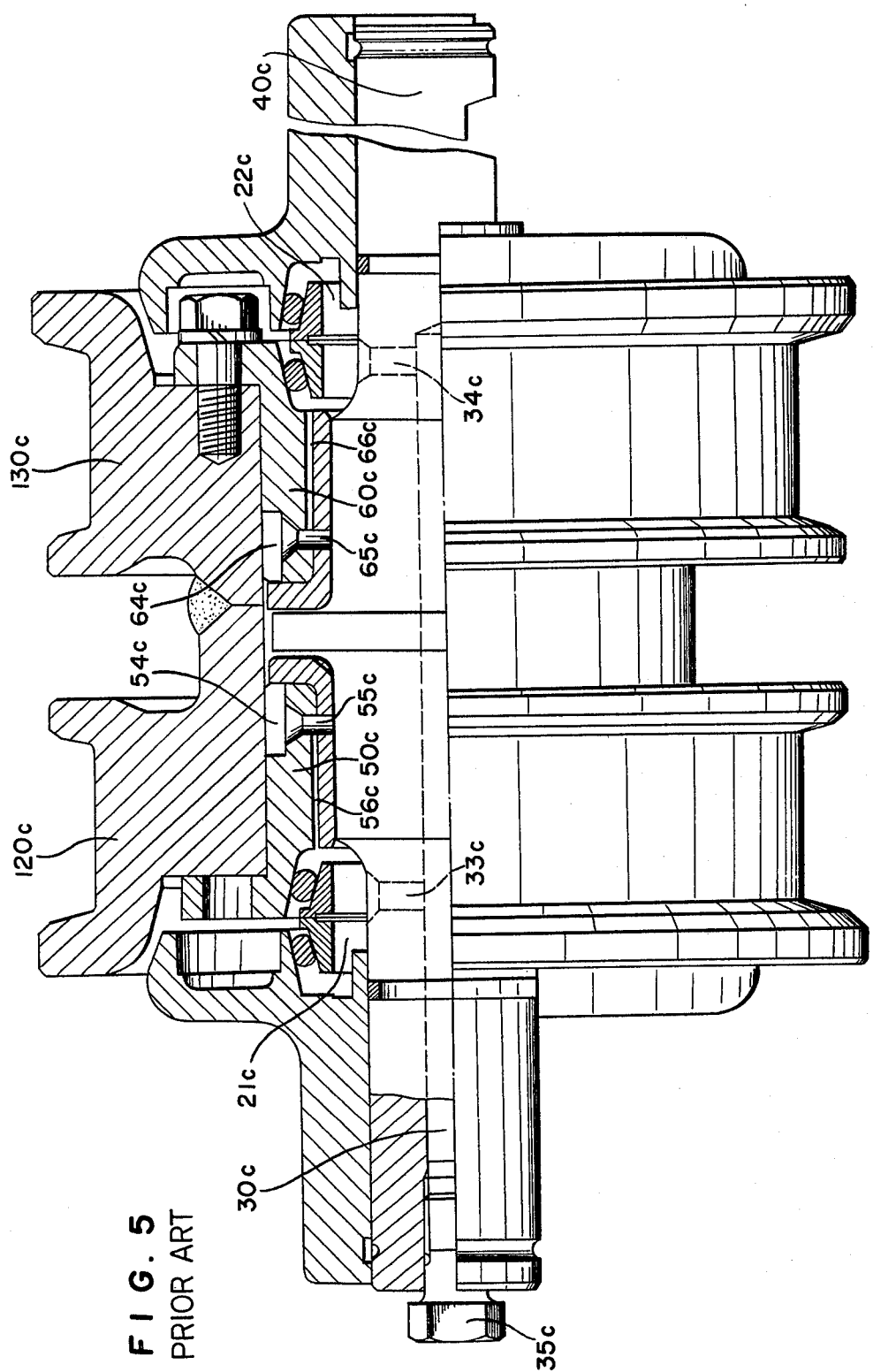
FIG. 5 is an elevational view of a conventional track roller device, partly in section, with the upper half and the essential parts thereof being shown in section.

Reference is now made to FIG. 4, which shows another embodiment of the present invention.

Reference numeral 40b designates a shaft of the track roller device, and 100b designates an intermediate cylinder fitted onto the shaft 40b through bushes 109b and 110b and inside cylinders 50b and 60b. The intermediate cylinder 100b has a collar 101b formed at the middle portion thereof. Numerals 120b and 130b designate rollers having cylindrical inside surfaces 121b and 131b, respectively, which are removably fitted onto the left and right circumferential surfaces of the intermediate cylinder 100b, respectively.

Rollers 120b and 130b have annular stepped portions on the inside surfaces thereof, respectively, which portions consist of side surfaces 122b and 132b extending perpendicularly to the shaft 40b and positioned at about the axial mid-point of the roller width and internal circumferential surfaces forming large-diameter holes 123b and 133b, respectively. In this case, the side surface 122b or 132b is so disposed that, when the roller 120b or 130b is brought into contact with the side surface of the annular boss 101b of the intermediate cylinder 100b, the side surface 120b or 130b is positioned slightly axially outwardly of the corresponding axially outer surface 102b or 105b of the intermediate cylinder 100b.

Inside cylinders 50b and 60b are fitted inbetween the inside surface of the intermediate cylinder 100b and the shaft 40b from the left and right sides, respectively. The flanges 51b and 61b of the inside cylinders 50b and 60b contact the side surfaces 122b and 132b of the above-mentioned annular stepped portion. When the inside cylinders 50b and 60b are placed in position, the circumferential surfaces 58b and 68b of the flanges 51b and 61b of the inside cylinders are in contact with the internal circumferential surfaces of the above-mentioned large-diameter holes 124b and 134b. The inside cylinder flanges 51b and 61b have through bolt holes 54b and 64b respectively, and the intermediate cylinder 100b has tapped holes 103b and 106b for receiving the bolts. Bolts 107b are inserted through the through-holes 54b and are screwed in the tapped holes 103b, and bolts 171b extend through the through-holes 64b into the tapped holes 106b. Thereby the rollers and the intermediate cylinder are tightly fixed together.

An annular gap is formed by recesses in the circumferential surface end 104b or 107b of the intermediate cylinder and the corresponding end 124b or 134b of the roller 120b or 130b. In this gap, an O-ring 180b or 181b is inserted. The roller 120b or 130b is strongly pressed against the side of the annular boss 101b of the intermediate cylinder 100b by the inside circumferential portion 57b or 67b of the inside collar 51b or 61b, and thereby the rollers 120b and 130b are normally rotated in unison about the shaft 40b through the inside cylinders 50b and 60b and through the bushes 109b and 110b. The axially inner collar-side surfaces 111b and 112b of bushes 109b and 110b loosely contact the opposite sides of the central collar 41b of the shaft 40b to control the roller positions.

In a construction as mentioned above, slippage may occur between the cylindrical inside surface of the roller and the intermediate cylinder when the roller is rotated. However, in the present invention, a lateral force obtained by the use of the both side surfaces of the inside cylinder and annular boss presses the roller against the intermediate cylinder and thereby the roller and the cylinder rotate in unison without slip, even when a considerably strong impact is applied on the roller. Accordingly, the device of the present invention does not require high constructional precision and it is suitable for mass production, and therefore it can be made inexpensively and it possesses high performance characteristics.

Moreover, since an O-ring is fitted in the outside portion of the mating surface between the roller and the intermediate cylinder, the inside surface of the roller becomes completely water-tight and therefore free of rust. As a result, when a roller is to be replaced after a long-time use, it can be easily disassembled and replaced because no rust has occurred.

Further, the position of the O-ring is not limited to that of the examples as shown in FIGS. 1–4. The O-ring may be provided in annular grooves formed at other places. Still further, a plate spring or packing can be used in place of the O-rings.

The rollers overhang both ends of the intermediate cylinder and therefore are subjected to an outwardly tilting force. However, in the present invention, the above force is received by the inside circumferential surfaces 123b and 133b and the circumferential surface of the inside cylinder collar to prevent various troubles caused by deformation of the roller into a trumpet shape due to inclination of the roller.

The embodiments of the invention in which an exclusive property or privilege is claimed are defined as follows:

1. A track roller device, comprising: a shaft; a pair of axially spaced-apart inner cylinders rotatably supported on said shaft, said inner cylinders each having a radially outwardly extending flange at the axially outer end thereof; an intermediate cylinder surrounding said pair of inner cylinders with its opposite axial ends being disposed in confronting relationship to said flanges and being secured thereto for rotation therewith, said intermediate cylinder having an annular radially outwardly projecting boss at about the axial midpoint thereof; a pair of separate rollers sleeved on said intermediate cylinder on axially opposite sides of said boss with each roller being disposed in association with one of said inner cylinders, said rollers each having an enlarged internal cylindrical recess in the axially outer side thereof and a radially extending end wall at the inner end of said recess, said end wall of said roller abuttingly engaging the flange of its associated inner cylinder so that said roller is retained on said intermediate cylinder by said flange, and the opposite axially inner sides of said rollers abutting against the opposite sides of said annular boss whereby said rollers are clamped between said flanges and said boss; cooperating wall means defining a pair of lubricant flow passages which respectively extend between said intermediate cylinder and one of said inner cylinders and have a first branch extending radially inwardly to between said shaft and said inner cylinder and a second branch extending axially into a sealed lubrication zone surrounding said shaft and disposed axially outside of said inner cylinder; and radially extending passage means in said annular boss of said intermediate cylinder for supplying lubricant to said lubricant flow passages.

2. A track roller device as claimed in claim 1 in which sealing means are disposed between the internal surface of said intermediate cylinder and the external surfaces of said inner cylinders at locations axially outwardly of said lubricant flow passages.

3. A track roller device as claimed in claim 2 in which said pair of lubricant flow passages communicate at their axially inner ends with said radially extending passage means in said annular boss of said intermediate cylinder, said lubricant flow passages each comprising a narrow gap defined between a collar on said shaft and the internal surface of said intermediate cylinder, an enlarged axial passage defined by opposed wall portions of said intermediate cylinder and said inner cylinder and extending axially away from said gap, radial hole means communicating with said axial passage and extending radially through said inner cylinder and the bushing between said inner cylinder and said shaft, and axially extending passage means between said bushing and the internal surface of said inner cylinder for providing communication between said radial hole means and said sealed lubrication zone.

4. A track roller device as claimed in claim 1 in which sealing means are disposed between the flanges of said inner cylinders and the portions of the rollers and the intermediate cylinder that are axially opposed to the flanges of said inner cylinders.

5. A track roller device as claimed in claim 4, wherein the axially outer ends of said intermediate cylinder are spaced axially inwardly from the radially extending end wall of the associated roller, said flanges on said inner cylinders abutting against said end walls of the rollers, an annular groove defined by cooperating portions of said end wall of each roller and the adjacent axially outer end of the intermediate cylinder and said sealing means being disposed in said grooves contacted by said flanges.

* * * * *